United States Patent
Jang et al.

(10) Patent No.: US 10,164,840 B2
(45) Date of Patent: Dec. 25, 2018

(54) DEVICE AND METHOD FOR CONFIGURING MULTIPLE INTERFERERS

(71) Applicant: Kookmin University Industry Academy Cooperation Foundation, Seoul (KR)

(72) Inventors: Byungjun Jang, Seoul (KR); Jinsoo Park, Seoul (KR); Hyungoo Yoon, Gimpo-si (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 326 days.

(21) Appl. No.: 15/175,040

(22) Filed: Jun. 7, 2016

(65) Prior Publication Data

US 2017/0134241 A1   May 11, 2017

(30) Foreign Application Priority Data

Nov. 9, 2015  (KR) .................. 10-2015-0156881

(51) Int. Cl.
  *H04L 12/24*   (2006.01)
  *H04J 1/12*    (2006.01)
  (Continued)

(52) U.S. Cl.
  CPC ............. *H04L 41/145* (2013.01); *H04J 1/12* (2013.01); *H04L 5/001* (2013.01); *H04L 5/0051* (2013.01);
  (Continued)

(58) Field of Classification Search
  None
  See application file for complete search history.

(56) References Cited

U.S. PATENT DOCUMENTS

2002/0141375 A1* 10/2002 Choi .................. H04W 16/14
                                                    370/347
2007/0242621 A1* 10/2007 Nandagopalan ...... H04L 12/413
                                                    370/254
(Continued)

FOREIGN PATENT DOCUMENTS

KR   10-2007-0121405 A   12/2007
KR   10-2010-0038736 A   4/2010
KR      10-1376721 B1    3/2014

OTHER PUBLICATIONS

Jang et al., "Interference Analysis and Its Mitigation Policy Based on MAC Layer for Peaceful Co-Existence between Unlicensed Devices", The Journal of Korean Institute of Electromagnetic Engineering and Science 24(8), 2013. 8, pp. 841-848.

*Primary Examiner* — Alex Skripnikov
*Assistant Examiner* — Pamit Kaur
(74) *Attorney, Agent, or Firm* — Revolution IP, PLLC

(57) ABSTRACT

An approach is provided for configuring multiple interferers. An interference effect minimum protective distance is calculated in response to detection of an input of an interferer parameter. Physical (PHY) layer modeling is performed to individually apply a pathloss caused by a separation distance between an interferer node and a victim and apply a pathloss of each node to an attenuator and a transmitter amplifier in an HW manner. MAC layer modeling is performed to determine a transmission node and a transmission time using Markov chain or determine a transmission node and a transmission time using a result log file of an external MAC simulator and a transmission/reception time is reflected in an HW manner by turning ON/OFF a switch. Multiple correlated interferer signals are generated for analyzing an effect of frequency interference in view of both of PHY and MAC layers.

9 Claims, 13 Drawing Sheets

(51) Int. Cl.
*H04L 5/00* (2006.01)
*H04L 12/26* (2006.01)
*H04L 27/00* (2006.01)
*H04W 16/14* (2009.01)
*H04W 24/00* (2009.01)

(52) U.S. Cl.
CPC ........ *H04L 5/0073* (2013.01); *H04L 27/0006* (2013.01); *H04L 43/08* (2013.01); *H04L 43/50* (2013.01); *H04W 16/14* (2013.01); *H04W 24/00* (2013.01); *H04L 5/0069* (2013.01)

(56) References Cited

U.S. PATENT DOCUMENTS

2007/0291636 A1* 12/2007 Rajagopal .............. H04B 1/719
370/208
2009/0213740 A1* 8/2009 Ganguly ............. H04L 41/0896
370/252

* cited by examiner

INTERFERENCE OCCURS
WHEN #2 PERFORMS
TRANSMISSION BEFORE
PACKET #1 ENDS

WI-FI MULTI-INTERFERER GENERATOR PACKET

DEVICE AND METHOD FOR CONFIGURING MULTIPLE INTERFERERS

CROSS-REFERENCE TO RELATED APPLICATIONS

This application claims the priority of Korean Patent Application No. 2015-0156881 filed on Nov. 9, 2015, in the Korean Intellectual Property Office, the disclosure of which is incorporated herein by reference.

BACKGROUND OF THE INVENTION

Field of the Invention

The present invention relates to a configuration and analysis of multiple interferers, and more particularly, to a device and method for configuring multiple interferers that are modeled in both physical (PHY) layers and media access control (MAC) layers, and an interference analysis device and method using multiple interferers.

Description of the Related Art

As wireless devices such as smart phones and tablet PCs are being widely used in recent years, wireless data traffic is expected to grow rapidly.

In order to accommodate this traffic, there have been making efforts to improve the performance and spectral efficiency of a wireless network. Among them, spectrum sharing of Wi-Fi and Zigbee in a 2.4 GHz unlicensed band is widely used. Another conventional approach is a spectrum sharing of Wi-Fi and unlicensed long term evolution (LTE) or LTE licensed-assisted access (LTE-LAA) in a 5 GHz unlicensed band.

However, frequency interference between wireless systems caused by these spectrum sharing may result in performance degradation. Therefore, it is necessary to analyze an effect of frequency interference in various aspects of wireless communications.

Therefore, there is a need for an approach for all of these conditions taking into considered in frequency interference analysis.

SUMMARY OF EXEMPLARY EMBODIMENTS OF THE INVENTION

The present invention is conceived to solve the problem of the conventional interference analysis for a wireless communication system. An aspect of the present invention provides a device and method for configuring multiple interferers that are modeled in both PHY layers and media access control (MAC) layers, and an interference analysis device and method using multiple interferers.

An aspect of the present invention also provides a device and method for configuring multiple interferers for actually analyzing an effect of frequency interference existing when two or more wireless communication systems share a frequency or are partially overlapped in their frequency bands in view of both of PHY and MAC layers, and an interference analysis device and method using multiple interferers.

An aspect of the present invention also provides a device and method for configuring multiple interferers that applies a starting time and an ending time of transmission of multiple correlated interferers through internal modeling using Markov chain or an external result of a network simulator (NS2, OPNET, or the like) in order to analyze frequency interference with respect to a victim receiver communicating with at least one user terminal when at least one interferer exists, and an interference analysis device and method using multiple interferers.

An aspect of the present invention also provides a device and method for configuring multiple interferers in which if performance degradation of a victim having a specific protocol caused by an interference effect needs to be checked, when at least one interferer exists in a network, a starting time and an ending time of a packet transmitted by the interferer are determined by internal modeling using Markov chain or an external result of a network simulator (NS2, OPNET, or the like) and power of each interferer determined to perform transmission is affected by a pathloss depending on a distance between the victim and the interferer, and an interference analysis device and method using multiple interferers.

An aspect of the present invention also provides a device and method for configuring multiple interferers for implementing a packet transmitted by an interferer as data packet and Ack packet having an average length as defined in the protocol as well as SIFS, DIFS and contention window, and an interference analysis device and method using multiple interferers.

The aspects of the present invention are not limited to the above-exemplarily described aspects, and other aspects, which are not mentioned herein, can be clearly understood by those skilled in the art from the following description.

According to an aspect of the present invention, there is provided a device for configuring multiple interferers, including: a protective distance calculation unit configured to calculate an interference effect minimum protective distance when an interferer parameter is input; an interferer spatial distribution determination unit which randomly distributes interferers within an interference effect distance or enables a user to directly determine an interferer spatial distribution; a PHY layer modeling unit configured to perform PHY layer modeling by individually applying a pathloss caused by a separation distance between an interferer node and a victim; a node pathloss reflection unit configured to apply a pathloss of each node to an attenuator and a transmitter amplifier in an HW manner; an MAC layer modeling unit configured to perform MAC layer modeling for determining a transmission node and a transmission time using Markov chain or determining a transmission node and a transmission time using a result log file of an external MAC simulator; a transmission/reception time reflection unit configured to reflect a transmission/reception time in an HW manner by turning ON/OFF a switch; and an interferer transmitting signal generation unit configured to generate multiple correlated interferer signals for analyzing an effect of frequency interference in view of both of PHY and MAC layers.

According to another aspect of the present invention, there is provided a method for configuring multiple interferers, including: calculating an interference effect minimum protective distance when an interferer parameter is input; randomly distributing interferers within an interference effect distance or enabling a user to directly determine an interferer spatial distribution; performing PHY layer modeling to individually apply a pathloss caused by a separation distance between an interferer node and a victim and apply a pathloss of each node to an attenuator and a transmitter amplifier in an HW manner; performing MAC layer modeling to determine a transmission node and a transmission time using Markov chain or determine a transmission node and a transmission time using a result log file of an external MAC simulator and reflecting a transmission/reception time in an HW manner by turning ON/OFF a switch; and generating multiple correlated interferer signals for analyzing an effect of frequency interference in view of both of PHY and MAC layers.

According to yet another aspect of the present invention, there is provided an analysis device using multiple interferers, including: a protective distance calculation unit configured to calculate an interference effect minimum protective distance when an interferer parameter is input; an interferer spatial distribution determination unit which randomly distributes interferers within an interference effect distance or enables a user to directly determine an interferer spatial distribution; a PHY layer modeling unit configured to perform PHY layer modeling by individually applying a pathloss caused by a separation distance between an interferer node and a victim; a node pathloss reflection unit configured to apply a pathloss of each node to an attenuator and a transmitter amplifier in an HW manner; an MAC layer modeling unit configured to perform MAC layer modeling for determining a transmission node and a transmission time using Markov chain or determining a transmission node and a transmission time using a result log file of an external MAC simulator; a transmission/reception time reflection unit configured to reflect a transmission/reception time in an HW manner by turning ON/OFF a switch; an interferer transmitting signal generation unit configured to generate multiple correlated interferer signals for analyzing an effect of frequency interference in view of both of PHY and MAC layers; and a frequency interference analysis unit configured to analyze an effect of frequency interference in view of both of PHY and MAC layers by defining the probability that the total interference power reaching a victim receiver by using the generated multiple interferers can be equal to or higher than an interference limit as an interference probability.

According to still another aspect of the present invention, there is provided an interference analysis method using multiple interferers, including: calculating an interference effect minimum protective distance when an interferer parameter is input; randomly distributing interferers within an interference effect distance or enabling a user to directly determine an interferer spatial distribution; performing PHY layer modeling to individually apply a pathloss caused by a separation distance between an interferer node and a victim and apply a pathloss of each node to an attenuator and a transmitter amplifier in an HW manner; performing MAC layer modeling to determine a transmission node and a transmission time using Markov chain or determine a transmission node and a transmission time using a result log file of an external MAC simulator and reflecting a transmission/reception time in an HW manner by turning ON/OFF a switch; generating multiple correlated interferer signals for analyzing an effect of frequency interference in view of both of PHY and MAC layers; and analyzing an effect of frequency interference in view of both of PHY and MAC layers by defining the probability that the total interference power reaching a victim receiver by using the generated multiple interferers can be equal to or higher than an interference limit as an interference probability.

The device and method for configuring multiple interferers and the analysis device and method using multiple interferers according to the present invention have the following effects.

Firstly, since all of the characteristics of an MAC layer and the characteristics of a PHY layer of an interferer are considered, they can be easily applied to modeling of an actual interference environment.

Secondly, when there are many interferers, it is possible to check an interference effect caused by an interferer with consideration for an MAC layer between the interferers. Unlike a conventional HW simulator, when the number of interferer nodes increases, it is possible to conduct an interference analysis with a closer approximation to an actual environment.

Thirdly, consideration for the number of interferers can be implemented with internal modeling using Markov chain and a mathematical equivalent model or an external result of a network simulator (NS2, OPNET, or the like), and, thus, unlike a conventional HW simulator, it is possible to reduce system complexity caused by an increase in number of interferers.

Fourthly, they can be applied to all of a link-level simulation and a system simulation depending on modeling of a victim.

Fifthly, when there is a single victim for analysis of an interference effect, it is possible to obtain a result of a quantitative interference effect such as BER through a link-level simulation in which one or more interferers exist.

Sixthly, when there are many victims, an MAC layer between the victims also needs to be considered, and, thus, it is possible to apply a system-level simulation and thus possible to obtain a transmission rate and a degree of delay.

BRIEF DESCRIPTION OF THE DRAWINGS

The invention is illustrated by way of example, and not by way of limitation, in the figures of the accompanying drawings in which like reference numerals refer to similar elements. The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
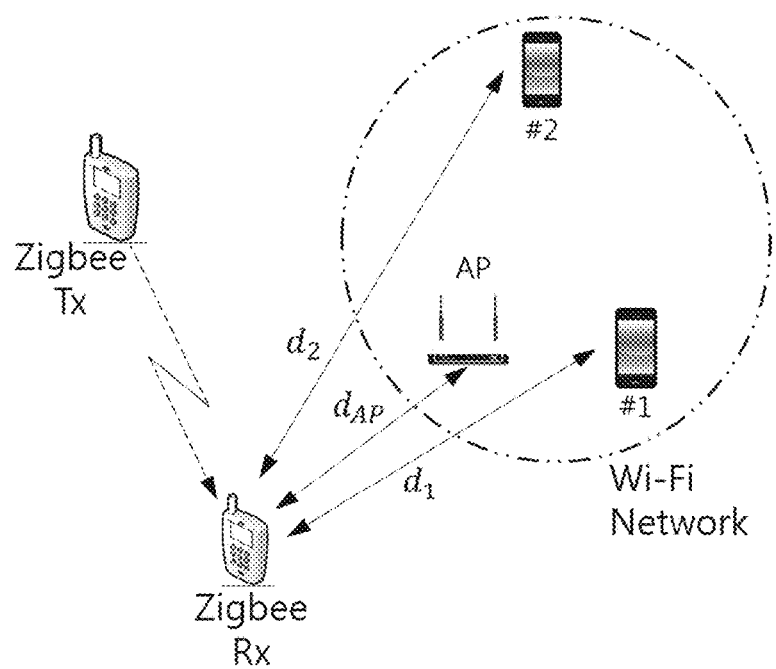
FIG. 1 is a configuration view illustrating a general frequency interference environment.

An apparatus, method, and software for configuring multiple interferers are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a physical layer (PHY) modeling and MAC layer modeling, it is recognized by one of ordinary skill in the art that the embodiments of the inventions have applicability to any type of interference analysis system in wireless communication systems.

Features and advantages of the device and method for configuring multiple interferers and the interference analysis device and method using multiple interferers according to the present invention will become clear from the following detailed descriptions of the exemplary embodiments.

Firstly, if a new frequency band is assigned to a wireless system, it is necessary to analyze an effect of frequency interference with existing wireless communication systems and to check the possibility whether the frequency band can be shared.

If frequency interference exists, guard bands or separation distances can be calculated as a result of the frequency interference analysis.

Also, when a wireless operator installs new wireless communication base stations (BSs) or access points (APs), the analysis can be used in selecting the locations of BSs or APs or in setting up channels for minimizing frequency interference.

There are two types of frequency interference analysis methods according to the layers in which the analysis results are obtained: one is the PHY layer method; and the other is MAC layer method.

In detail, the PHY layer method mainly shows frequency interference effects caused by spatial distributions of a victim and interferers and frequency overlapping without considering time domain characteristics. The MAC layer method presents how much data packets between a victim and interferers collide in time domain.

There are also two kinds of frequency interference analysis devices: software (SW) simulators; and HW simulators, depending on whether real hardware (HW) devices exist therein or not.

TABLE 1

| Layer | Analysis method | Analysis result | Analysis domain | Representative simulator |
|---|---|---|---|---|
| PHY layer | MCL, E-MCL, MC Simulation | Interference power, SINR, BER | Space, Frequency | SEAMCAT |
| MAC layer | Event Simulation | Throughput, QoS, Delay | Space, Time | NS-2/3, Opnet |

Table 1 summarizes the conventional methods for analyzing frequency interference.

Examples of the PHY layer method as a method for analyzing frequency interference may include an MCL (Minimum Coupling Loss) method, an E-MCL (Enhanced MCL) method, and an MC (Monte Carlo) method.

The MCL method is a method for deriving protection criteria satisfying an interference limit from the worst-case scenario, and the MC method is a statistical method for modeling interference probability in spatial and frequency domains.

The E-MCL method is a hybrid method in which some parameters of the MCL method may be calculated by the MC method. All the above-described three methods are examples of the PHY layer method. A representative simulator is SEAMCAT (Spectrum Engineering Advanced Monte Carlo Analysis Tool) as a software tool released for free by the European Radiocommunications Office (ERO).

The PHY layer method is usually implemented with software (SW), but the MC method can be implemented with hardware (HW) as well as SW.

The MAC layer method has been used for analyzing the performance of a wireless communication system (transmission rate, delay time, and the like) and thus can analyze interference in part. However, if the number of wireless communication terminals that cause interference increases, a calculation time increases significantly. Therefore, it is difficult to actually use for interference analysis.

Further, the MAC layer method cannot reflect characteristics of various PHY layers. Further, the MAC layer method is implemented mainly using SW such as NS-2/3, and OPNET, but cannot be implemented with HW.

However, actually, interference exists when all of space, frequency, and time are overlapped. Therefore, in order to accurately verify interference, it is necessary to integrate a PHY layer and an MAC layer.

In a method using SW, a PHY is a discrete time domain simulation by sampling a time domain uniformly, and an MAC is an event simulation in which only a starting point and an ending point of a packet are important.

Therefore, typically, a BER (Bit Error Rate) is obtained from the PHY and then, an FER (Frame Error Rate) is calculated by using an equation, and, thus, an MAC performance result is simply derived.

Further, a result of a simple SW simulation is not a result of an actual interference environment, and, thus, it is not sufficient for verification.

Meanwhile, a conventional interference measuring device (or HW simulator) can be implemented limitedly to an interference analysis, and, thus, can analyze characteristics of frequency interference mainly from a PHY layer only.

In the case of using a commercial HW modem, the PHY and the MAC are in an integrated state. However, in this case, most of the parameters are built in as chips. Thus, it is difficult to quantitatively analyze an effect of interference.

However, in the case of using such a conventional HW simulator, when the number of interferer nodes increases, interference power simply doubles, which is different from the actual environment.

That is, in the actual environment, if interferers are coordinated, the MAC determines transmission of the interferers. Therefore, even if the number of interferer nodes increases, interference power does not increase proportionally.

In order to conduct an interference analysis with a closer approximation to the actual environment, there is a need for a hardware-based device and method for emulating an interferer with consideration for both of a PHY layer and an MAC layer.

In the prior art, most of SW methods among the frequency interference analysis methods are tools for analyzing an interference effect only from a PHY layer or analyzing an interference effect only from an MAC layer.

This is a result of a simple simulation using SW modeling, and, thus, it is not sufficient for analyzing an actual interference effect. Further, in most of HW simulators which are being currently used, an interferer continuously performs transmission from a PHY layer without consideration for an MAC layer. Therefore, an interference effect is analyzed on the basis of an interference power amount only.

Likewise, there is no consideration for an overall MAC layer with respect to an interferer. Therefore, when multiple interferers of the same kind coexist together, it is not sufficient for implementing an actual protocol such as a packet collision algorithm (for example, CSMA/CA).

That is, it is a method for statistically modeling interference power caused by distribution of multiple interferers when the interferers continuously perform transmission, and if an interference effect is analyzed by this method, it is impossible to find various interference effects caused by consideration for a specific time and a change in number of interferers.

FIG. 1 is a configuration view illustrating a general frequency interference environment.

In an actual frequency interference environment, multiple interference nodes form a specific network and wireless traffic is regulated by both of a PHY layer and an MAC layer as illustrated in FIG. 1.

Figure 2:
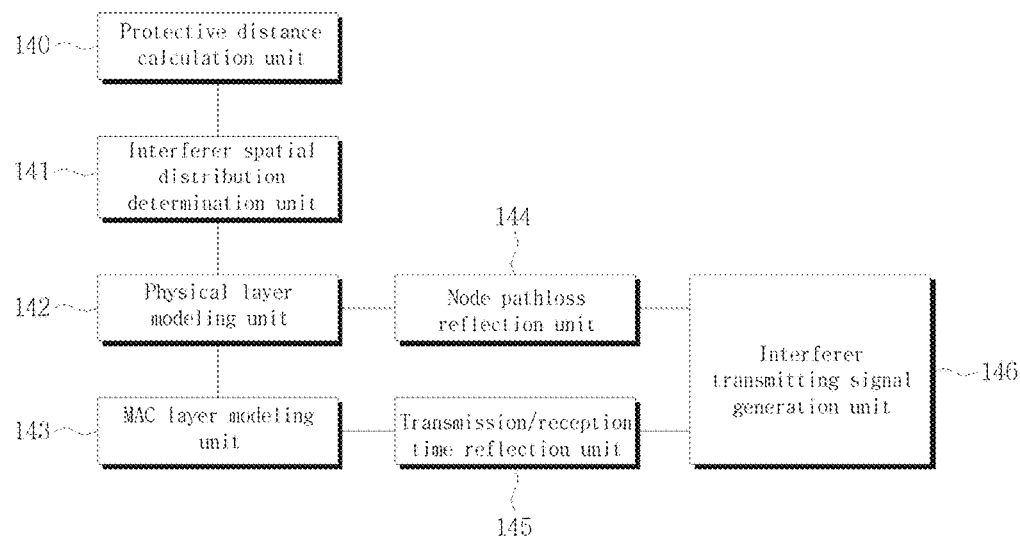
FIG. 2 is a block diagram of a device for configuring g multiple interferers according to various embodiments of the present invention.
Figure 3:
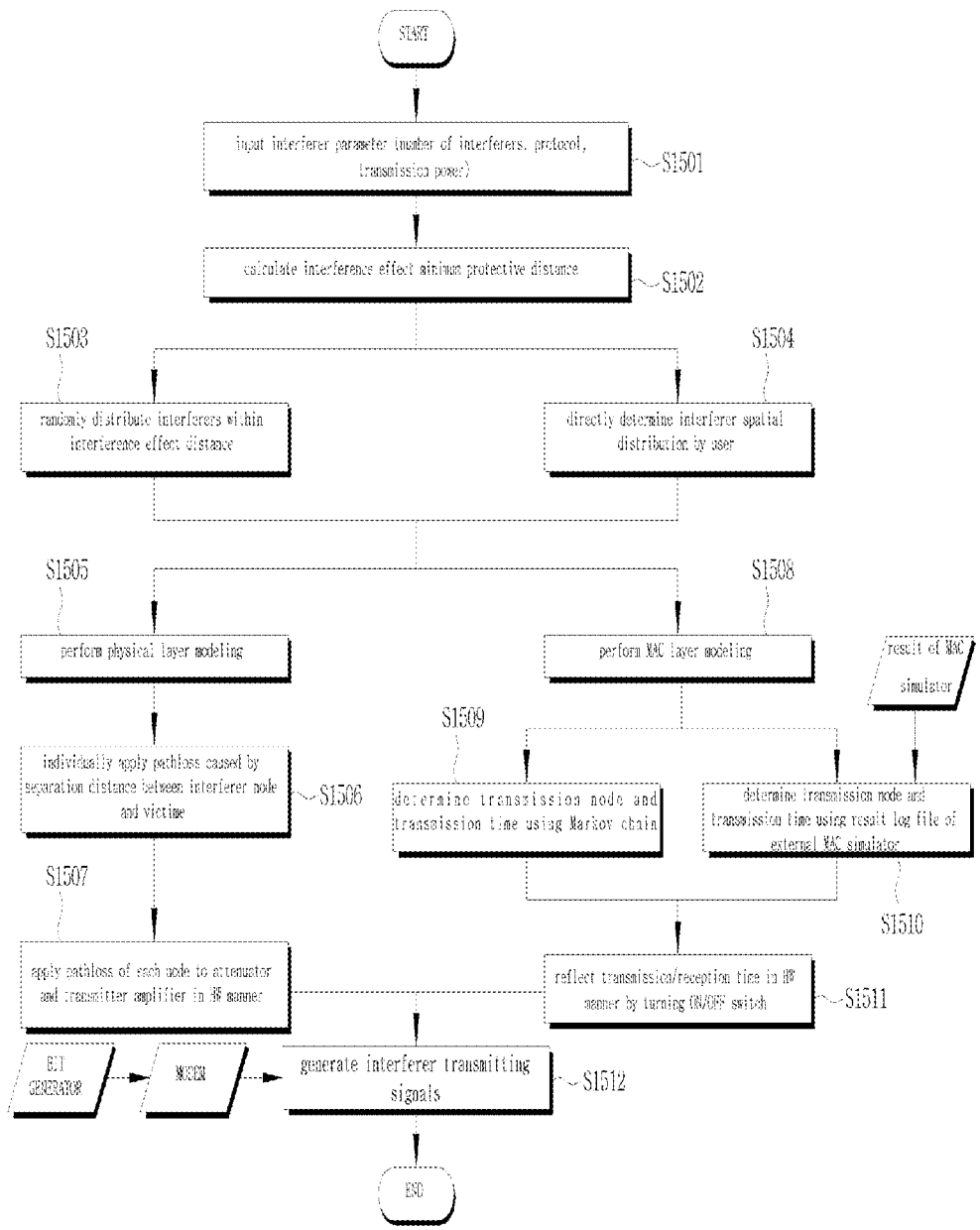
FIG. 3 is a flowchart of processes illustrating a method for configuring multiple interferers according to various embodiments of the present invention.

FIG. 2 is a block diagram of a device for configuring multiple interferers according to the present invention, and FIG. 3 is a flowchart illustrating a method for configuring multiple interferers according to various embodiments of the present invention.

The present invention relates to a device and method for configuring multiple correlated interferer signals for actually analyzing an effect of frequency interference existing when two or more wireless communication systems share a frequency or are partially overlapped in their frequency bands in view of both of PHY and MAC layers.

The present invention includes an interference analysis device and method using multiple interferers.

Further, if performance degradation of a victim having a specific protocol caused by an interference effect needs to be checked, when at least one interferer exists in a network, a starting time and an ending time of a packet transmitted by the interferer are determined by Markov chain and power of each interferer determined to perform transmission is affected by a pathloss depending on a distance between the victim and the interferer.

The device for configuring multiple interferers according to various embodiments of the present invention which includes, as illustrated in FIG. 2, a protective distance calculation unit 140 configured to calculate an interference effect minimum protective distance when an interferer parameter such as the number of interferers, a protocol, and transmission power is input; an interferer spatial distribution determination unit 141 which randomly distributes interferers within an interference effect distance or enables a user to directly determine an interferer spatial distribution; a PHY layer modeling unit 142 configured to perform PHY layer modeling by individually applying a pathloss caused by a separation distance between an interferer node and a victim; a node pathloss reflection unit 144 configured to apply a pathloss of each node to an attenuator and a transmitter amplifier in an HW manner; an MAC layer modeling unit 143 configured to perform MAC layer modeling for determining a transmission node and a transmission time using Markov chain or determining a transmission node and a transmission time using a result log file of an external MAC simulator; a transmission/reception time reflection unit 145 configured to reflect a transmission/reception time in an HW manner by turning ON/OFF a switch; and an interferer transmitting signal generation unit 146 configured to generate multiple correlated interferer signals for analyzing an effect of frequency interference in view of both of PHY and MAC layers.

The interference analysis device using multiple interferers according to various embodiments of the present invention is configured to analyze an effect of frequency interference in view of both of PHY and MAC layers by defining the probability that the total interference power reaching a victim receiver by using the multiple interferers generated by the device for configuring multiple interferers illustrated in FIG. 2 can be equal to or higher than an interference limit as an interference probability.

Further, in the method for configuring multiple interferers according to various embodiments of the present invention, when an interferer parameter such as the number of interferers, a protocol, and transmission power is input (S1501, hereinafter in step 1501), an interference effect minimum protective distance is calculated (S1502) as illustrated in FIG. 3.

After the protective distance is calculated, interferers are randomly distributed within an interference effect distance (S1503), or a user directly determines an interferer spatial distribution (S1504).

Then, PHY layer modeling is performed (S1505) and a pathloss caused by a separation distance between an interferer node and a victim is individually applied (S1506).

Further, a pathloss of each node is applied to an attenuator and a transmitter amplifier in an HW manner (S1507).

Furthermore, MAC layer modeling is performed (S1508) to determine a transmission node and a transmission time using Markov chain (S1509) or determine a transmission node and a transmission time using a result log file of an external MAC simulator (S1510).

Also, a transmission/reception time is reflected in an HW manner by turning ON/OFF a switch (S1511).

Then, multiple correlated interferer signals for analyzing an effect of frequency interference in view of both of PHY and MAC layers are generated (S1512).

Further, the interference analysis method using multiple interferers according to various embodiments of the present invention includes analyzing an effect of frequency interference in view of both of PHY and MAC layers by defining the probability that the total interference power reaching a victim receiver by using the multiple interferers generated by the method for configuring multiple interferers illustrated in FIG. 3 can be equal to or higher than an interference limit as an interference probability.

A general situation where frequency interference exists will be described for better understanding of the device and method for configuring multiple interferers and the analysis device and method using multiple interferers according to various embodiments of the present invention.

Figure 4:
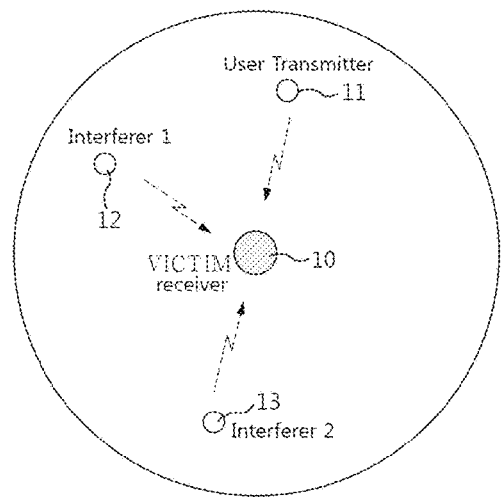
FIG. 4 is a configuration view illustrating an example where interference exists by spatial distributions of interferers.

FIG. 4 is a configuration view illustrating an example where interference exists by spatial distributions of interferers.

As illustrated in FIG. 4, a victim receiver 10 may receive data from at least one user transmitter 11.

As such, when the victim receiver 10 communicates with the user transmitter 11, one or more heterogeneous interferers (Interferer 1) (Interferer 2) 12 and 13 may transmit data in the same frequency band at the same time as the victim receiver 10 and thus cause interference to the victim receiver 10.

Figure 5:
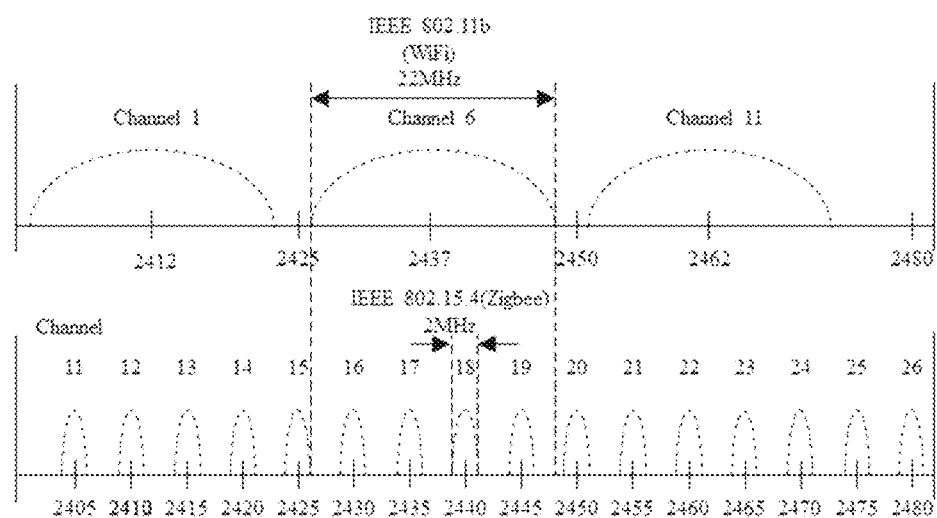
FIG. 5 is a channel assignment diagram of a 2.4 GHz unlicensed band system.

FIG. 5 is a channel assignment diagram of a 2.4 GHz unlicensed band system as an example provided to describe a situation where interference exists by sharing of a frequency between wireless systems.

As illustrated in FIG. 5, a Wi-Fi device and a Zigbee device can share a 2.4 GHz unlicensed band, and if their frequency channels are overlapped, interference may exist.

For example, if an interferer Wi-Fi is used in Channel 6, as for the Zigbee, interference may exist in Channels 16 to 18.

Figure 6:
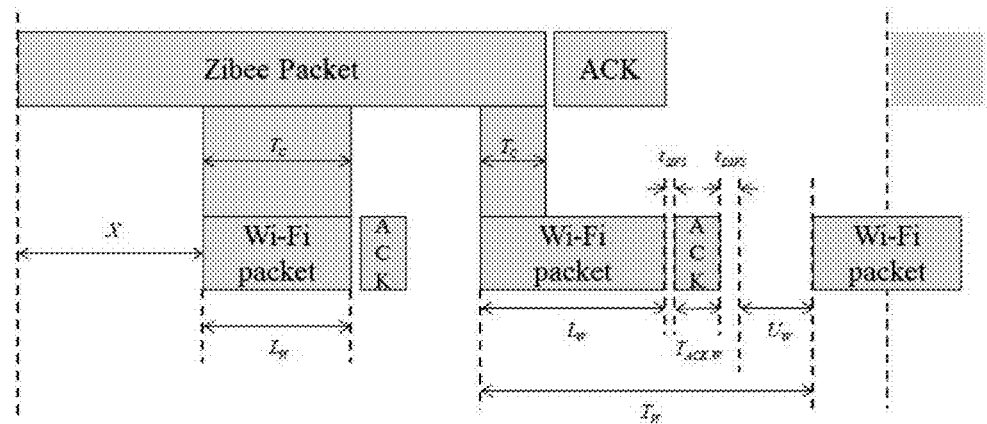
FIG. 6 is a packet protocol diagram of a 2.4 GHz unlicensed band system.

FIG. 6 is a packet protocol diagram of a 2.4 GHz unlicensed band system as an example provided to describe a situation where interference exists according to time between wireless systems.

Table 2 summarizes interference model parameters in time domain.

TABLE 2

| Parameter | Definition | Value |
| --- | --- | --- |
| $T_Z$ | Distance between two Zigbee data packets | 6186 μs |
| $L_Z$ | Length of Zigbee data packet | 4064 μs |
| $T_{SIFS}$ | Short interframe space of Zigbee | 10 μs |
| $T_{ack.Z}$ | Length of Zigbee ACK packet | 352 μs |
| $U_Z$ | Average backoff of Zigbee | 1120 μs |
| TCCA | Clear channel assessment time | 640 μs |
| $T_W$ | Distance between Wi-Fi packets | 1977 μs |
| $L_W$ | Length of Wi-Fi packet | 1303 μs |
| $t_{SIFS.W}$ | Short interframe space of WiFi | 10 μs |
| $t_{DIFS.W}$ | DIFS (Distributed coordination function interframe) | 50 μs |
| $T_{ack.W}$ | Length of Wi-Fi ACK packet | 304 μs |
| $U_W$ | Backoff time of WiFi | 0 to 620 μs |
| X | Time offset | Specific value |
| $T_C$ | Collision time | Specific value |

When frequency channels of two devices are overlapped, if there is no sufficient distance between the two devices, interference may occur depending on a degree of collision between protocol packets.

Figure 7:
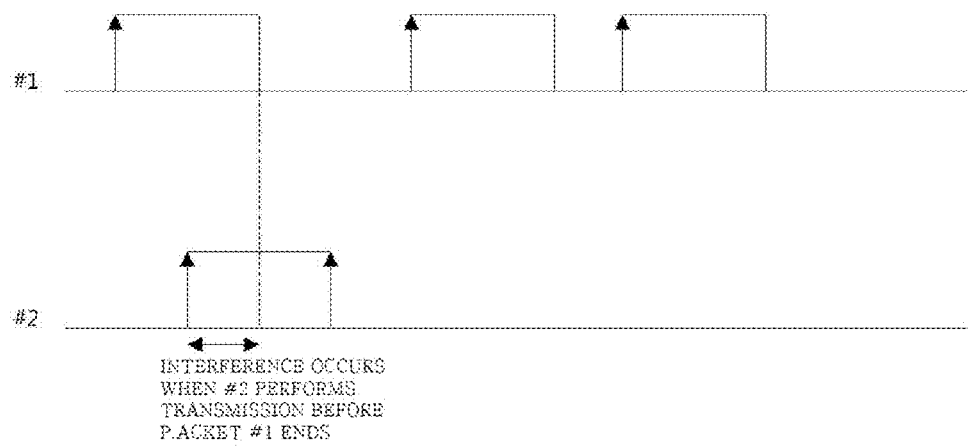
FIG. 7 is a frequency interference simulation diagram of an MAC simulator.

Referring to FIG. 7, a method for analyzing frequency interference in an MAC layer simulator will be described.

As illustrated in FIG. 7, a media access control (MAC) layer is a layer for multiple accesses, and may be present on a PHY layer according to a communication protocol. The MAC layer is configured to process only transmission starting point and ending point of a packet as events and thus analyze frequency interference on the basis of a degree of collision between a packet of an interferer and a packet of a victim.

It is necessary to perform complicated coding operations to a pair of wireless communication devices according to the standard in order to implement such an MAC layer. In this case, if the number of user transmitters or interferers increases, complexity and a calculation time increase significantly.

Figure 8:
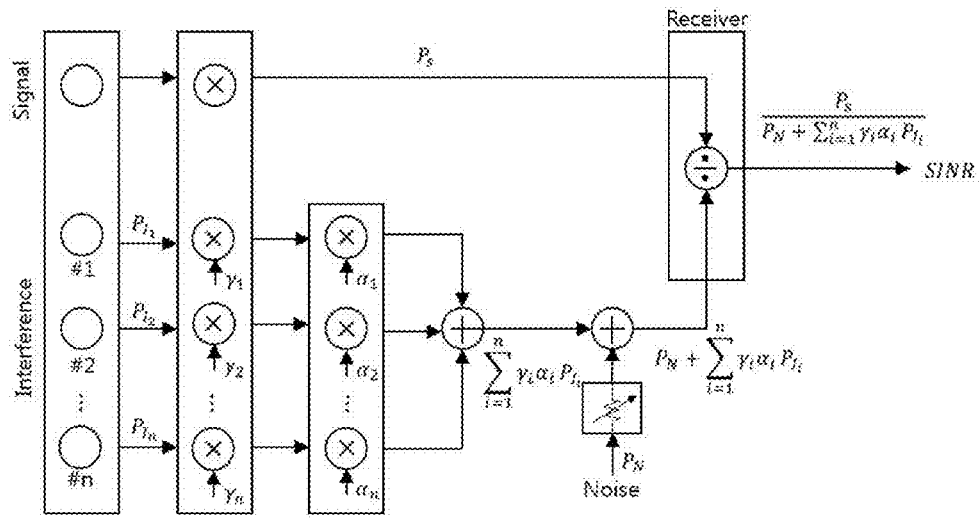
FIG. 8 is a configuration view illustrating a frequency analysis from a PHY layer with consideration for both of a frequency and a space.

FIG. 8 is a configuration view illustrating a frequency analysis from a PHY layer with consideration for both of a frequency and a space.

Referring to FIG. 8, a method for analyzing frequency interference in a PHY layer simulator will be described. The PHY layer simulator is configured to calculate only interference power which may vary depending on a separation distance and a use channel, which may result in low complexity.

That is, only an SINR (signal-to-interference-plus-noise-ratio) is obtained by using a pathloss caused by a separation distance and a spectrum factor and a noise model according to a use channel so as to measure an interference effect.

The SINR can be calculated by Equation 1.

$$SINR = \frac{P_S}{P_N + \gamma_i \alpha_i \beta_i P_{I_i}} \quad \text{[Equation 1]}$$

Herein, $P_S$ denotes signal power received by a receiver, $P_N$ denotes noise power in a receiver, γ denotes a parameter indicative of a degree of pathloss, α denotes a spectrum factor which varies depending on a use channel, and $P_I$ denotes a transmission power amount of an interferer.

Accordingly, if interference power reaching a victim transmitter is greater than an SNR (signal-to-noise-ratio), there may be an interference effect. In the inverse case, there may be almost no interference effect.

However, as for frequency interference in the PHY layer, it is difficult to perform modeling of a case where the number of interferer increases and also difficult to actually recognize a decrease in data rate and a data delay time caused by interference.

A frequency has not often been shared by wireless communication systems heretofore. In most cases, guard bands are calculated in order to avoid interference. Therefore, it has been sufficient to analyze interference from a PHY layer. In recent years, spectrum sharing (for example, Wi-Fi, Zigbee, and the like) at 2.4 GHz and spectrum sharing (for example, Wi-Fi, LTE-U, and the like) at 5 GHz have become an issue. Therefore, a frequency interference analysis method using a PHY layer only is not suitable to be applied to a latest system for spectrum sharing.

Further, β indicates whether a specific node can perform transmission depending on whether a collision occurs in a time domain. If βs of two or more nodes have a value of 1 at the same time, a collision occurs and the nodes except one node randomly have a backoff time and perform transmission. If only one β has a value of 1 at the same time, there is no collision and the nodes perform transmission immediately.

Herein, α and γ have analogue values of from 0 to 1, whereas β varies depending on a type of a network formed by interferer nodes, requirements of nodes for data transmission/reception, and characteristics of an MAC layer.

Therefore, since variety of values, it cannot be calculated interpretively or statistically, and a value should be changed according to a packet transmission period a packet non-transmission period of each interferer by actually performing modeling of an MAC layer formed by an interferer.

Figure 9:
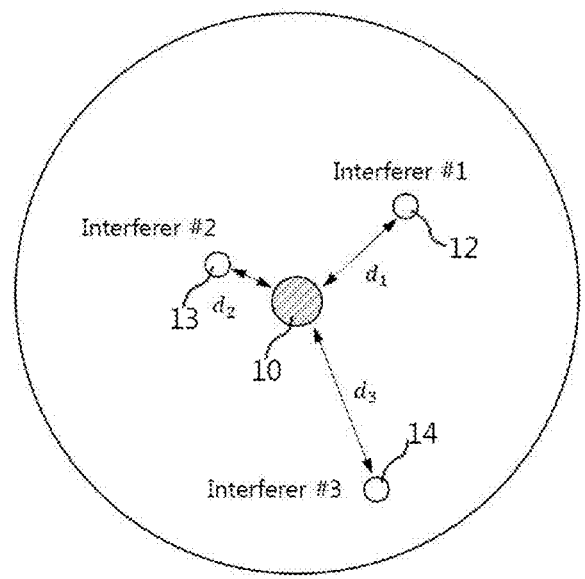
FIG. 9 is a configuration view of a state where there exist multiple correlated interferers integrated by constructing a PHY layer and performing mathematical modeling of an MAC layer.
Figure 10:
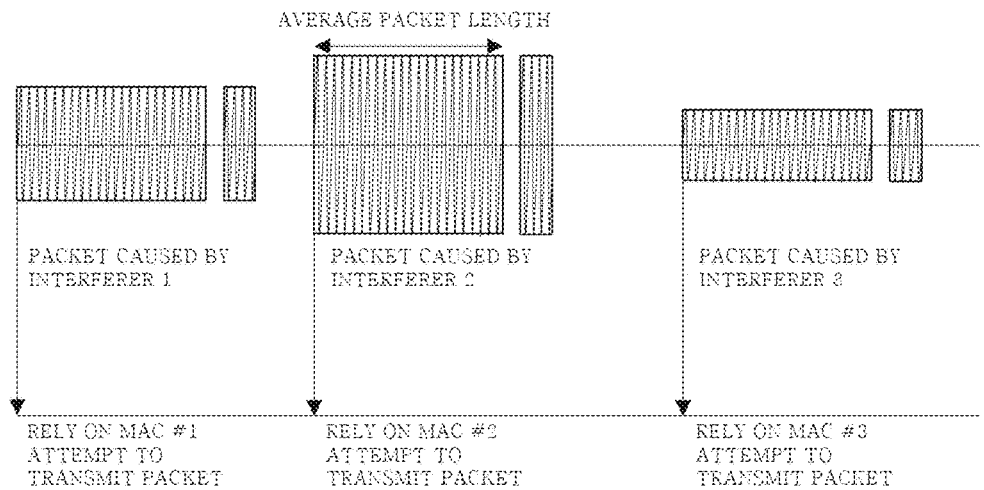
FIG. 10 is a transmission packet diagram of multiple correlated interferers according to the present invention.

FIG. 9 is a configuration view of a state where there exist multiple correlated interferers integrated by constructing a PHY layer and performing mathematical modeling of an MAC layer, and FIG. 10 is a transmission packet diagram of multiple correlated interferers according to various embodiments of the present invention.

For example, Markov chain may be used to implement an interferer in which a PHY layer and an MAC layer are integrated as illustrated in FIG. 9 and FIG. 10 in order to perform modeling of a situation where at least one interferer exists.

FIG. 9 illustrates that different pathlosses can be individually applied according to actual distribution of interferers. A pathloss in an interior environment using a frequency of 2.4 GHz is defined by Equation 2.

$$Pathloss(d) = \begin{cases} 20\log_{10}\left(\frac{4\pi d}{\lambda}\right), & d \le d_0 \\ 20\log_{10}\left(\frac{4\pi d}{\lambda}\right) + 33\log_{10}\frac{d}{d_0}, & d > d_0 \end{cases}$$ [Equation 2]

Herein, d denotes a separation distance between interferers 12, 13, and 14 and a victim receiver 10, and λ denotes a wavelength of a use frequency.

FIG. 10 is a conceptual diagram of an interferer according to various embodiments of the present invention in which a transmission time is determined by applying Markov chain to interferers individually applied with different pathlosses according to spatial distributions.

As can be seen with reference to FIG. 9, interference power of each interferer and interference time caused by multiple interferers can be determined.

A frequency interference model prepared with consideration for the above-described matters and all of frequency, spatial and time domains is as illustrated in FIG. 9.

Figure 11:
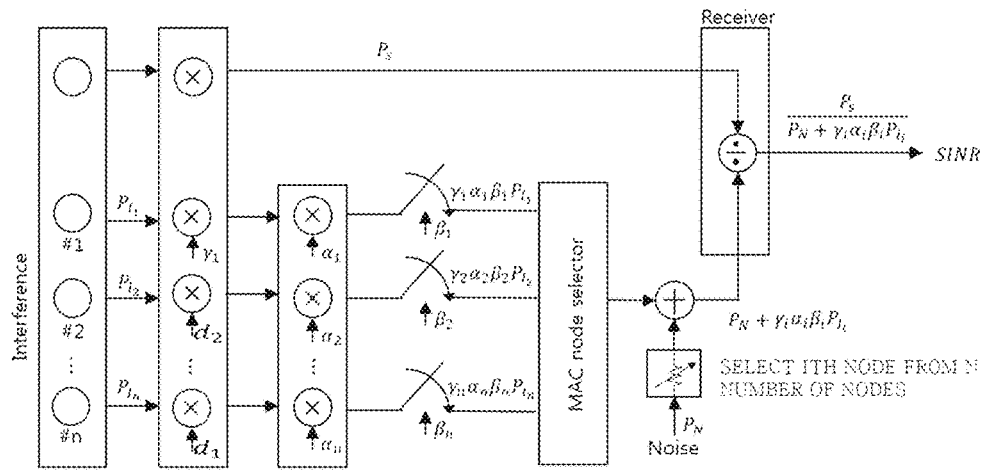
FIG. 11 is a configuration view of a frequency interference analysis from a PHY layer and an MAC layer with consideration for all of frequency, spatial and time domains according to various embodiments of the present invention.
Figure 12:
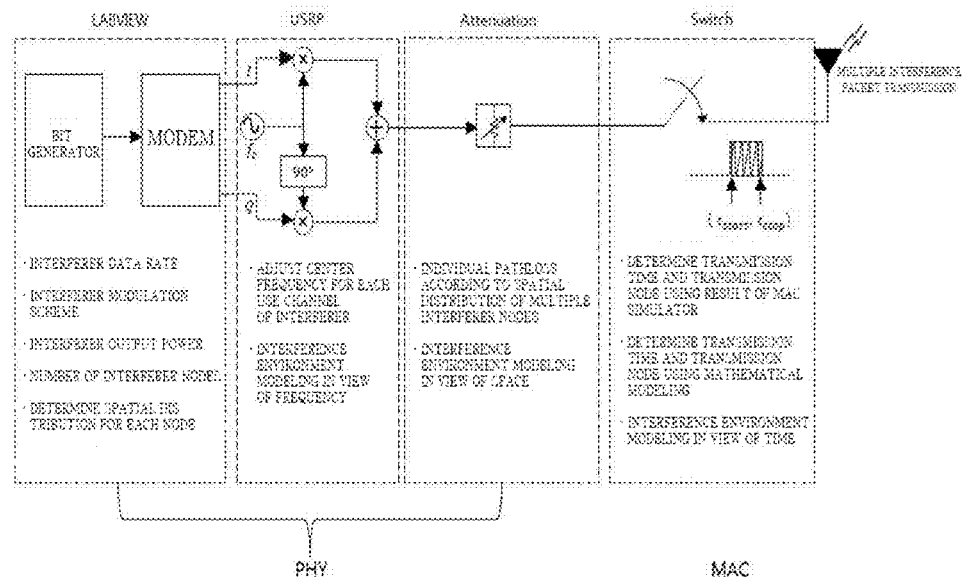
FIG. 12 is a configuration view of a device for configuring multiple interferers according to various embodiments of the present invention.

FIG. 11 is a configuration view of a frequency interference analysis from a PHY layer and an MAC layer with consideration for all of frequency, spatial and time domains according to various embodiments of the present invention, and FIG. 12 is a configuration view of a device for configuring multiple interferers according to various embodiments of the present invention.

The device for configuring multiple interferers according to various embodiments of the present invention is as illustrated in FIG. 12.

Even if there are many interferers, nodes constituting a single network follow the principle in which a signal is transmitted from only one node at a time by an MAC layer. Therefore, it is possible to simply configurate a multi-interference signal generator by reflecting characteristics of a frequency, a space, and a time of each node to each packet without configuring a separate transmitter for each node.

Firstly, a random bit generator and a modem are implemented in a software manner by using a LabVIEW program. Therefore, it becomes easy to modify PHY layer parameters such as a data rate, a modulation scheme, and a baseband filter and, thus, it is possible to easily perform modeling of a transmission packet of an interferer.

Then, a center frequency and an output of the interferer are adjusted using an SDR transmitter such as a USRP board, and an RF signal is output to generate an RF signal to be actually transmitted.

As for the MAC layer, data are transmitted only between a transmission time and a reception time for each packet by using mathematical modeling such as Markov chain or applying an external MAC simulator such as NS-2/3 to a switch.

A spatial distance between an interferer and a victim is calculated by a size of each packet, and, thus, a signal strength of each packet is determined. All the parameters relevant to transmission of a packet are implemented with the LabVIEW, and, thus, it is possible to create a packet of multi-interference signals with consideration for all of interference parameters.

As such, on a PC, different pathloss models are applied depending on a distribution of interferers and a transmission time of one or more interferers is determined using Markov chain.

Under this assumption, the probability that the total interference power reaching a victim receiver can be equal to or higher than an interference limit is defined as an interference probability and may be represented by Equation 3.

$$P_{int} = P_r(I \ge I_{th})$$ [Equation 3]

Herein, $I_{th}$ denotes an interference power reference value allowed in the victim receiver. Generally, a value suggested in the technical standard may be used as the interference power reference value. If there is no suggested value, the interference power reference value can be obtained by analyzing the link performance of the PHY layer.

Figure 13:
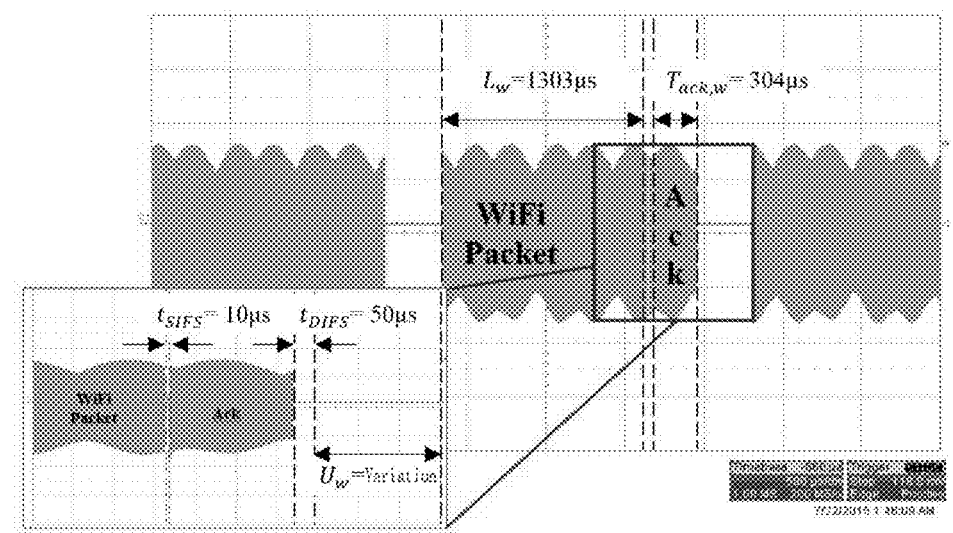
FIG. 13 is a configuration view illustrating an interference effect of correlated WLAN interferers on WPAN in a 2.4 GHz band using the present invention.

As illustrated in FIG. 13, if a payload is uniform, a data packet provided by a protocol, SIFS, DIFS, and Ack packet are uniform in size, and a transmission time which may vary depending on the number of interferers is determined by Markov chain and then output.

That is, $U_w$ varies depending on distribution and number of interferers.

FIG. 13 illustrates an interference effect of a Wi-Fi interferer in the case where a 2.4 GHz Wi-Fi is selected as multiple correlated interferers and a 2.4 GHz Zigbee is selected as a victim by applying the present invention.

As illustrated in FIG. 13, in the case where a time is not considered ($U_w=0$), the same analysis result as that of the PHY layer is obtained. However, in the case where a time is considered, a different interference effect is obtained.

That is, if an experiment is conducted under the condition where interference power is set to be greater by 3 dB than a signal, interference power achieved when transmission is continuously performed as illustrated in the analysis method of the PHY layer is always greater by 3 dB than a signal.

However, if the present invention is applied, a time is considered. Therefore, interference to a signal may vary depending on a degree of collision between packets.

In FIG. 13, a result is obtained by selecting the case where $U_w$ has a maximum Wi-Fi contention window. If $U_w$ is changed due to an increase in number of nodes and spatial distributions, a result may be present between the two graphs.

Figure 14:
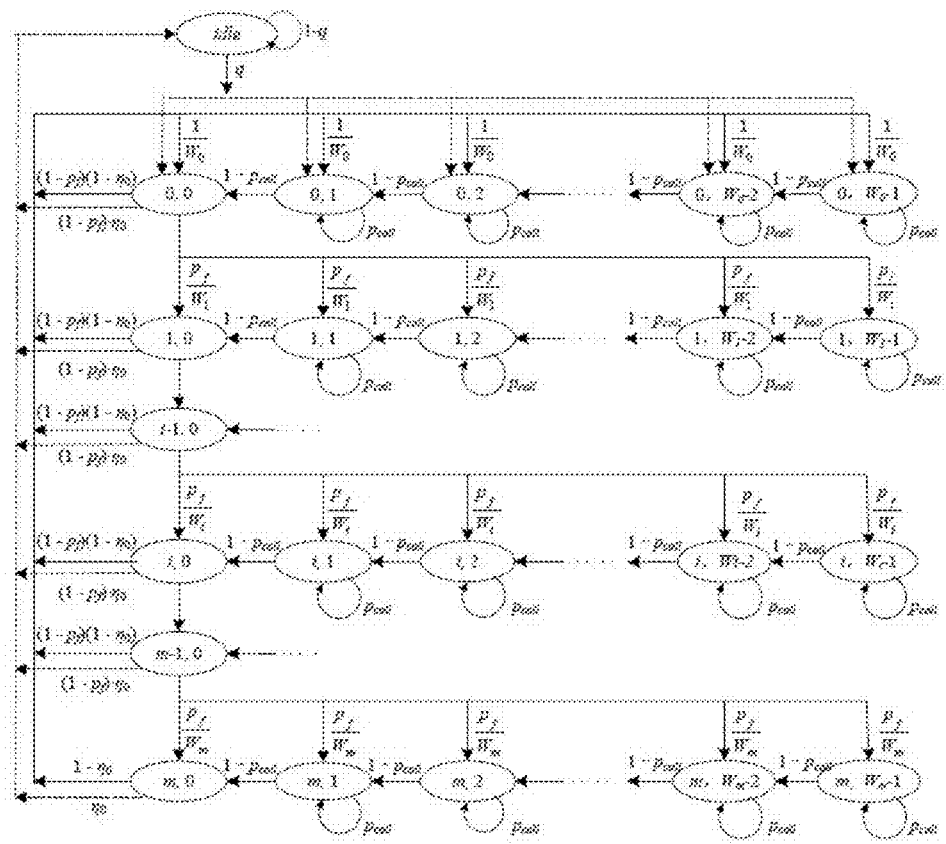
FIG. 14 is a Markov chain diagram provided to describe CSMA/CA-type MAC algorithm as a mathematical model of interferers when three correlated interferers exist according to various embodiments of the present invention.

FIG. 14 illustrates a case where a CSMA/CA (Carrier Sense Multiple Access-Collision Avoidance) protocol used in a WLAN is modeled by discrete time Markov chain.

Figure 15:
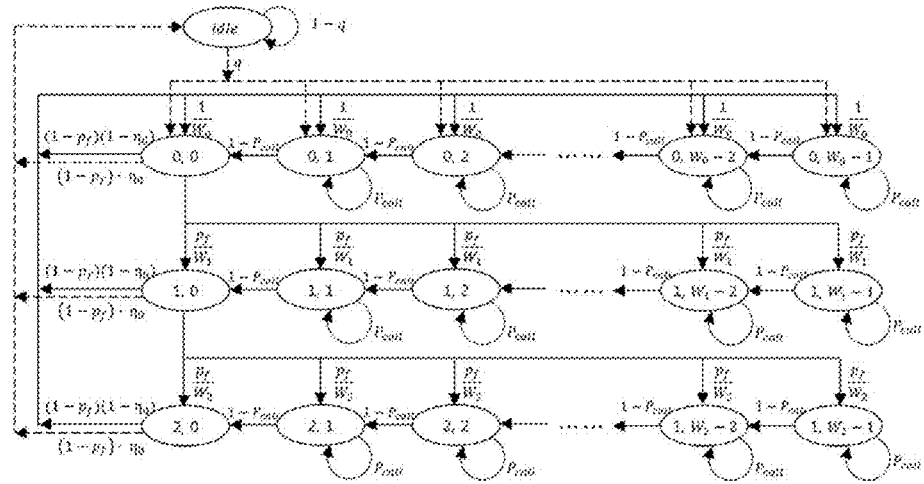
FIG. 15 is a Markov chain diagram illustrating an example where the number of correlated interferers is increased to m.

FIG. 15 illustrates Markov chain illustrating a state diagram of a CSMA/CA algorithm when there are only three correlated WLAN devices.

Figure 16:
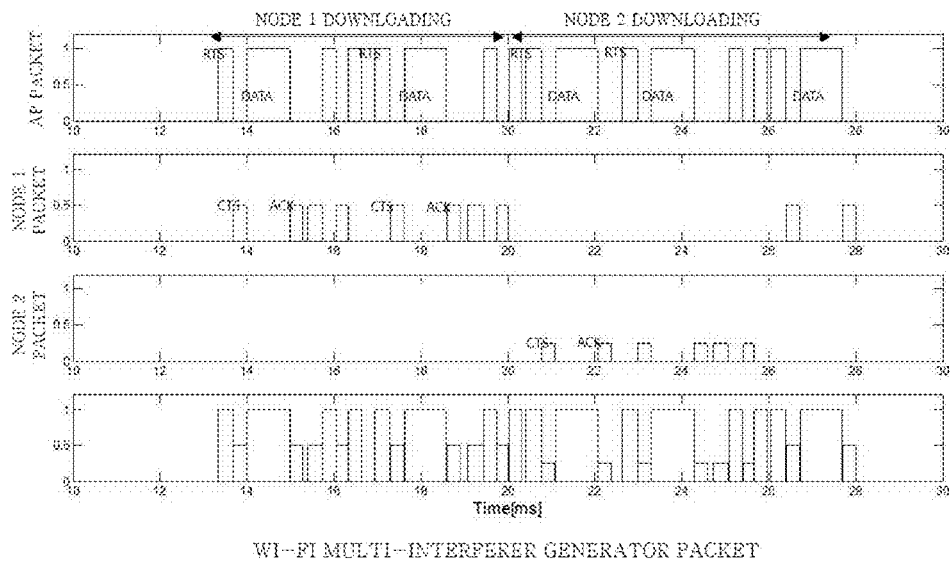
FIG. 16 is a packet waveform diagram of a device for configuring multiple interferers according to various embodiments of the present invention.

Further, FIG. 16 is a packet waveform diagram of a device for configuring multiple interferers according to various embodiments of the present invention.

Figure 17:
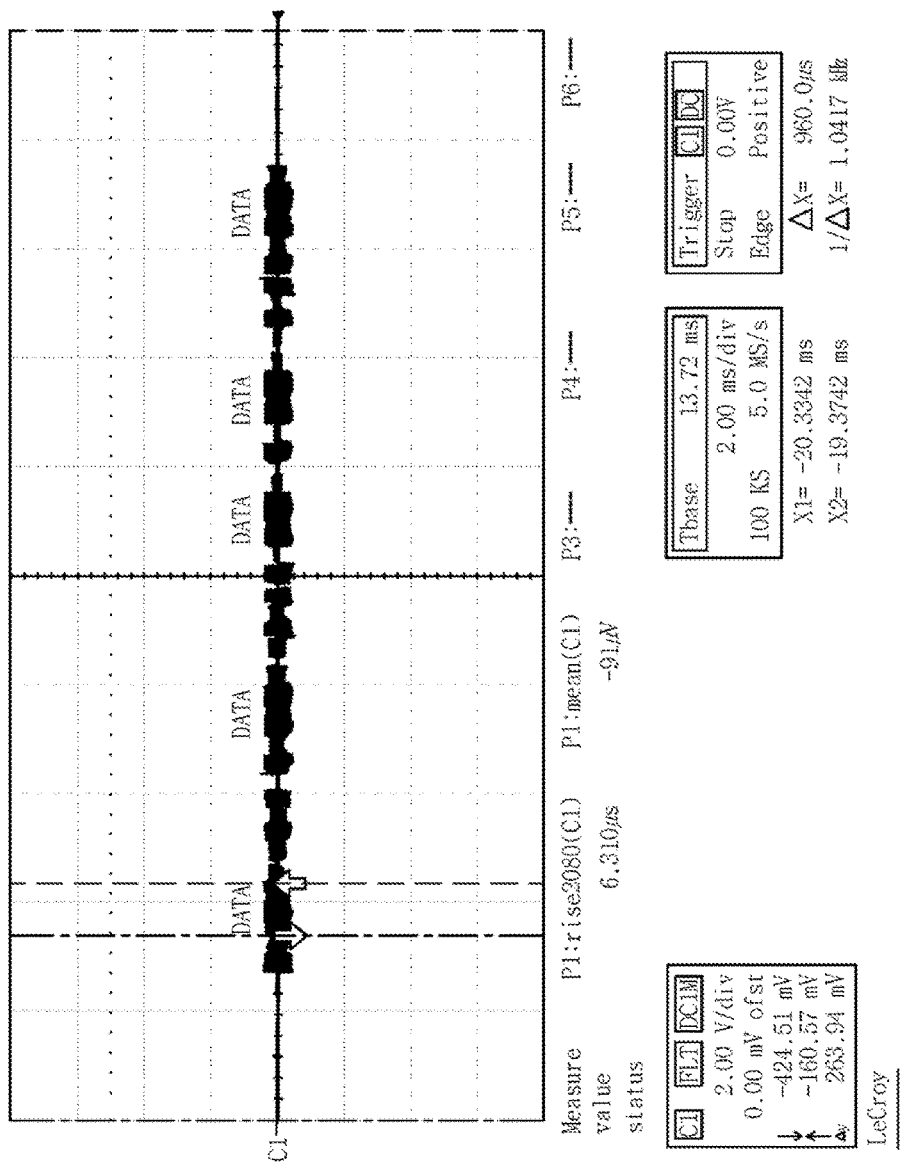
FIG. 17 is a packet oscilloscope waveform diagram of each node of a device for configuring multiple interferers according to various embodiments of the present invention.
Figure 18:
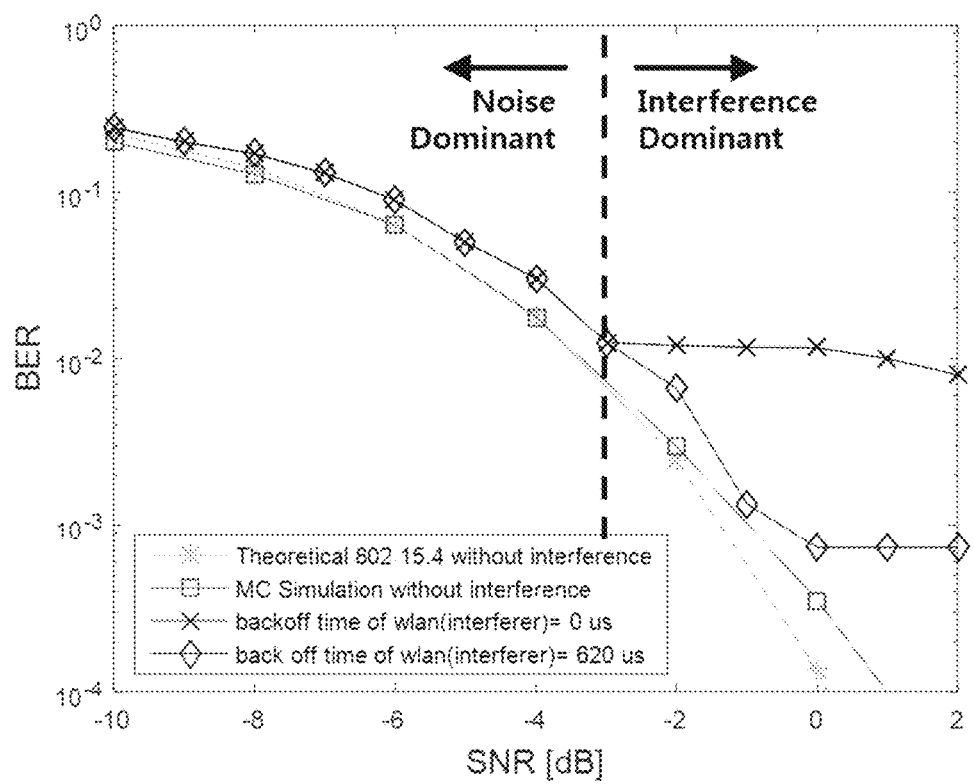
FIG. 18 is a graph of actual output signals from correlated WLAN interferers in a 2.4 GHz band using the present invention.

Furthermore, FIG. 17 is a packet oscilloscope waveform diagram of each node of a device for configuring multiple interferers according to the present invention, and FIG. 18 is a graph of actual output signals from correlated WLAN interferers in a 2.4 GHz band in Korea using the present invention.

In order to verify a device for configuring multiple interferers according to various embodiments of the present invention, a packet mode of Wi-Fi multiple interferers expected in an interference environment as illustrated in FIG. 4 is compared with a result of measuring a waveform of an actually implemented device for configuring multiple interferers with an oscilloscope. A result thereof is as follows.

WiFi interference power is used as an interference parameter, and the number of nodes is set to 3 including an AP.

In conjunction with the situation illustrated in FIG. 4, it is assumed that the AP has the shortest distance with respect to a Zigbee victim, a Wi-Fi node having the second shortest distance is set to #1 and a Wi-Fi node having the longest distance is set to #2, and data are being downloaded to the node 1 and the node 2 from the AP.

A waveform expected when individually applying a pathloss to nodes according to spatial distributions and using an event simulation result of Markov chain or NS-2/3 is as illustrated in FIG. 16.

As can be seen from FIG. 16, a pathloss is individually applied to each of the AP and the nodes and a transmission time for each node is determined.

First, it can be seen that the AP has less pathloss and thus has a high reference amplitude and transmits RTS (Ready to Send) before transmitting data.

A first node of the two nodes responds to the RTS and transmits CTS (clear to send) to inform the AP that the first node is ready to receive. Thus, the AP transmits data.

Then, the first node transmits RTS in order to transmit ACK informing the AP that the first node receives the data, and when CTS is received, the first node transmits ACK.

The AP communicates with the second node in a similar manner. Since a different pathloss is applied, there is a difference in a reference value of amplitude.

If the above-described settings are applied to the device for configuring multiple interferers according to various embodiments of the present invention, the oscilloscope waveform as illustrated in FIG. 17 can be obtained.

All of modem parameters follow the Wi-Fi protocol. However, there is a limit in frequency observable with an oscilloscope, and, thus, only a carrier center frequency is changed to 400 MHz.

By comparison between FIG. 16 and FIG. 17, application can be confirmed by measuring a transmission time.

FIG. 18 is a graph illustrating an actual measurement result obtained when an interferer and a victim are implemented with a WLAN and an IEEE 802.15.4 Zigbee, respectively, at 2.4 GHz under the above-described assumption.

In this experiment, the interference power is input to be twice the signal power. Therefore, in an area where the SNR is lower than −3 dB, the noise power is higher than the interference power. A theoretical value, a simulation result, and an interference experiment result exhibit the same result without any effect of interference.

Meanwhile, in an area where the SNR is higher than −3 dB, if the interference power is higher than the noise power, a theoretical value and a simulation result from the PHY layer exhibit different results due to an effect of interference.

Further, considering the MAC layer, an interference effect varies depending on a backoff time. If the Backoff time is 0, interference continuously occurs. Therefore, an error probability at an SNR of −3 dB is maintained regardless of the noise power.

On the other hand, if the backoff time is not 0 (620 μsec at 50% duty in the present example), an error rate may be about 50%. Therefore, it can be seen that an error probability at an SNR of 0 dB is maintained.

It can be seen from this experiment that an effect of interference varies depending on an MAC layer, and, thus, it is necessary to analyze this.

Figure 19A:
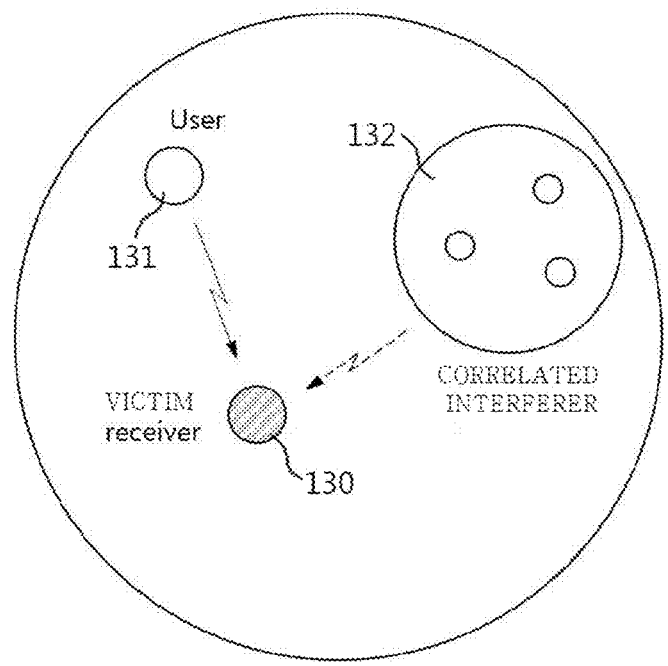
FIG. 19A through FIG. 19C are configuration views illustrating an interference environment where modeling can be performed using the present invention.
Figure 19B:
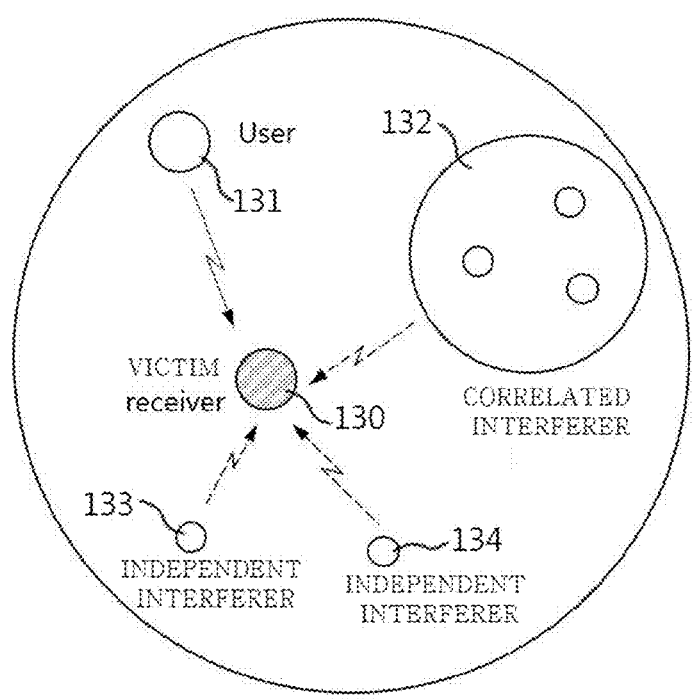

FIG. 19A illustrates a case where there are many correlated interferers at the same time as a first example to which the present invention can be applied, and FIG. 19B illustrates that independent and irrelevant interferers are added thereto.

If correlated interferers 132 in FIG. 19A are WLAN, a victim 130 in a 2.4 GHz band may be Zigbee and the victim in a 5 GHz band may be LTE-U. A reference numeral 131 denotes a user terminal.

Likewise, independent interferers 133 and 134 in FIG. 19B may be microwave ovens at 2.4 GHz and weather radars at 5 GHz.

Figure 19C:
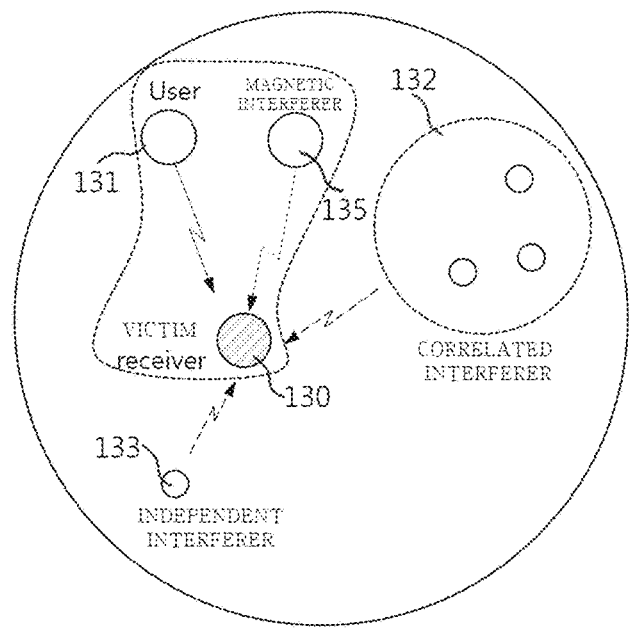

As illustrated in FIG. 19C, in most of unlicensed band devices, a transmission time between multiple homogenous devices is determined by MAC. Thus, it is necessary to analyze magnetic interference caused by a magnetic interferer 135.

Figure 20:
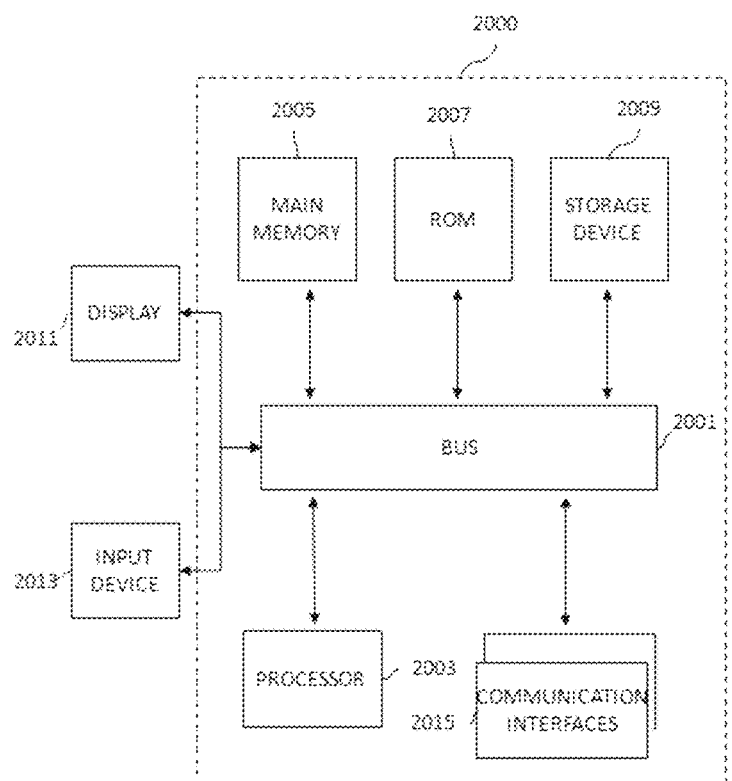
FIG. 20 is a diagram of hardware that can be used to implement various embodiments of the present invention.

FIG. 20 illustrates exemplary hardware upon which various exemplary embodiments according to the present invention can be implemented. FIG. 20 illustrates a circuit upon which an embodiment of the invention may be implemented. The circuit 2000 is programmed to carry out the inventive functions described herein and includes, for instance, the processor and memory components described with respect to FIG. 20 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction. By way of example, one or more units, e.g., protective distance calculation unit, interferer spatial distribution determination unit, physical layer modeling unit, MAC layer modeling unit, node pathloss reflection unit, transmission/reception time reflection unit, and interferer transmitting signal generation unit can be configured and executed by a processor using algorithms which associated with least one non-transitory storage device, the algorithms which when executed, causes the processor to perform the one or more units. Therefore, one or more units described in the present invention can be electronic components and circuitry in a board. These units can be a program that carries out specific functions and may be used alone or combined with other units.

A computing system 2000 includes a bus 2001 or other communication mechanism for communicating information and a processor 2003 coupled to the bus 2001 for processing information. The computing system 2000 also includes main memory 2005, such as a random access memory (RAM) or other dynamic storage device, coupled to the bus 2001 for storing information and instructions to be executed by the processor 2003. Main memory 2005 can also be used for storing temporary variables or other intermediate information during execution of instructions by the processor 2003. The computing system 2000 may further include a read only memory (ROM) 2007 or other static storage device coupled to the bus 2001 for storing static information and instructions for the processor 2003. A storage device 2009, such as a magnetic disk or optical disk, is coupled to the bus 2001 for persistently storing information and instructions.

The computing system 2000 may be coupled via the bus 2001 to a display 2011, such as a liquid crystal display, or active matrix display, for displaying information to a user. An input device 2013, such as a keyboard including alphanumeric and other keys, may be coupled to the bus 2001 for communicating information and command selections to the processor 2003. The input device 2013 can include a cursor control, such as a mouse, a trackball, or cursor direction keys, for communicating direction information and command selections to the processor 2003 and for controlling cursor movement on the display 2011.

According to one embodiment of the invention, the processes associated with boostrapping can be provided by the computing system 2000 in response to the processor 2003 executing an arrangement of instructions contained in main memory 2005. Such instructions can be read into main memory 2005 from another computer-readable medium, such as the storage device 2009. Execution of the arrangement of instructions contained in main memory 2005 causes the processor 2003 to perform the process steps described herein. One or more processors in a multi-processing arrangement may also be employed to execute the instructions contained in main memory 2005. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, various embodiments of the present invention are not limited to any specific combination of hardware circuitry and software.

The computing system 2000 also includes at least one communication interface 2015 coupled to bus 2001. The communication interface 2015 provides a two-way data communication coupling to a network link (not shown). The communication interface 2015 sends and receives electrical, electromagnetic, or optical signals that carry digital data streams representing various types of information. Further, the communication interface 2015 can include peripheral interface devices, such as a Universal Serial Bus (USB) interface, a PCMCIA (Personal Computer Memory Card International Association) interface, etc.

The processor 2003 may execute the transmitted code while being received and/or store the code in the storage device 2009, or other non-volatile storage for later execution. In this manner, the computing system 2000 may obtain application code in the form of a carrier wave.

The term "computer-readable medium" as used herein refers to non-transitory medium that participates in providing instructions to the processor 2003 for execution. Such a medium may take many forms, including but not limited to non-volatile media, volatile media, and transmission media. Non-volatile media include, for example, optical or magnetic disks, such as the storage device 2009. Volatile media include dynamic memory, such as main memory 2005. Transmission media include coaxial cables, copper wire and fiber optics, including the wires that comprise the bus 2001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Those of skill in the art will further appreciate that the various illustrative logical blocks, units, circuits, and algorithms described in connection with the embodiments disclosed herein may be implemented as electronic hardware, instructions stored in memory or in another computer-readable medium and executed by a processor or other processing device, or combinations of both. The units described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

As described above, the present invention is not limited to a specific wireless communication system.

In the above-described device and method for configuring multiple interferers and interference analysis device and method using multiple interferers according to various embodiments of the present invention, it is possible to perform modeling with a closer approximation to an actual interference environment using correlated interferers based on HW with consideration for a MAC layer.

This adds modeling of an MAC layer to a conventional hardware simulator. Thus, even if the number of interferer nodes increases, a proportional increase in interference power can be suppressed. Further, internal modeling using Markov chain or an external result of a network simulator (NS2, OPNET, or the like) is applied by SW on a PC, and, thus, actually, lots of hardware may not be needed, thereby reducing complexity.

As described above, it can be understood that the present invention is implemented as being modified and changed within the scope departing from the spirit and the scope of the present invention.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A device for configuring multiple interferers, comprising:
   a protective distance calculation unit configured to calculate an interference effect minimum protective distance in response to detection of an input of an interferer parameter;
   an interferer spatial distribution determination unit configured randomly to distribute interferers within an interference effect distance or to determine an interferer spatial distribution;
   a physical (PHY) layer modeling unit configured to perform PHY layer modeling by individually applying a pathloss caused by a separation distance between an interferer node and a victim;
   a node pathloss reflection unit configured to apply a pathloss of each node to an attenuator and a transmitter amplifier in an HW manner;
   a media access control (MAC) layer modeling unit configured to perform MAC layer modeling for determining a transmission node and a transmission time using Markov chain or determining a transmission node and a transmission time using a result log file of an external MAC simulator;
   a transmission/reception time reflection unit configured to reflect a transmission/reception time in an HW manner by turning ON/OFF a switch; and
   an interferer transmitting signal generation unit configured to generate multiple correlated interferer signals for analyzing an effect of frequency interference in view of both of PHY and MAC layers.

2. The device for configuring multiple interferers of claim 1, wherein the interferer parameter includes a number of interferers, a protocol, and transmission power.

3. The device for configuring multiple interferers of claim 1, wherein individual application of different pathlosses according to actual distribution of interferers in the PHY layer modeling unit is defined by the following equation, and in the case of an interior environment using a frequency of 2.4 GHz, $$Pathloss(d) = \begin{cases} 20\log_{10}\left(\frac{4\pi d}{\lambda}\right), & d \le d_0 \\ 20\log_{10}\left(\frac{4\pi d}{\lambda}\right) + 33\log_{10}\frac{d}{d_0}, & d > d_0 \end{cases},$$

wherein d denotes a separation distance between interferers and a victim receiver, and $\lambda$ denotes a wavelength of a use frequency.

4. A method for configuring multiple interferers, comprising:
   calculating an interference effect minimum protective distance in response to detection of an input of an interferer parameter;
   randomly distributing interferers within an interference effect distance or determining an interferer spatial distribution;
   performing PHY layer modeling to individually apply a pathloss caused by a separation distance between an interferer node and a victim and apply a pathloss of each node to an attenuator and a transmitter amplifier in an HW manner;
   performing MAC layer modeling to determine a transmission node and a transmission time using Markov chain or determining a transmission node and a transmission time using a result log file of an external MAC simulator and reflecting a transmission/reception time in an HW manner by turning ON/OFF a switch; and
   generating multiple correlated interferer signals for analyzing an effect of frequency interference in view of both of PHY and MAC layers.

5. An interference analysis device using multiple interferers, comprising:
   a protective distance calculation unit configured to calculate an interference effect minimum protective distance in response to detection of an input of an interferer parameter;
   an interferer spatial distribution determination unit configured randomly to distribute interferers within an interference effect distance or to determine an interferer spatial distribution;
   a PHY layer modeling unit configured to perform PHY layer modeling by individually applying a pathloss caused by a separation distance between an interferer node and a victim;
   a node pathloss reflection unit configured to apply a pathloss of each node to an attenuator and a transmitter amplifier in an HW manner;
   an MAC layer modeling unit configured to perform MAC layer modeling for determining a transmission node and a transmission time using Markov chain or determining a transmission node and a transmission time using a result log file of an external MAC simulator;
   a transmission/reception time reflection unit configured to reflect a transmission/reception time in an HW manner by turning ON/OFF a switch;
   an interferer transmitting signal generation unit configured to generate multiple correlated interferer signals for analyzing an effect of frequency interference in view of both of PHY and MAC layers; and
   a frequency interference analysis unit configured to analyze an effect of frequency interference in view of both of PHY and MAC layers by defining the probability that the total interference power reaching a victim receiver by using the generated multiple interferers can be equal to or higher than an interference limit as an interference probability.

6. The interference analysis device using multiple interferers of claim 5, wherein the frequency interference analysis unit obtains only an SINR (signal-to-interference-plus-noise-ratio) by using a pathloss caused by a separation distance and a spectrum factor and a noise model according to a use channel so as to measure an interference effect.

7. The interference analysis device using multiple interferers of claim 6, wherein, the SINR is calculated by $$SINR = \frac{P_S}{P_N + \gamma_i \alpha_i \beta_i P_{I_i}},$$

wherein $P_S$ denotes signal power received by a receiver, $P_N$ denotes noise power in a receiver, $\gamma$ denotes a parameter indicative of a degree of pathloss, $\alpha$ denotes a spectrum factor which varies depending on a use channel, $P_I$ denotes a transmission power amount of an interferer, and $\beta$ indicates whether a specific node can perform transmission depending on whether a collision occurs in a time domain.

8. The interference analysis device using multiple interferers of claim 5, wherein the frequency interference analysis unit is configured to define the probability that the total interference power reaching a victim receiver can be equal to or higher than an interference limit as $P_{int} = \Pr(I \geq I_{th})$, wherein $I_{th}$ denotes an interference power reference value allowed in the victim receiver.

9. An interference analysis method using multiple interferers, comprising:

calculating an interference effect minimum protective distance in response to detection of an input of an interferer parameter;

randomly distributing interferers within an interference effect distance or enabling a user to directly determine an interferer spatial distribution;

performing PHY layer modeling to individually apply a pathloss caused by a separation distance between an interferer node and a victim and applying a pathloss of each node to an attenuator and a transmitter amplifier in an HW manner;

performing MAC layer modeling to determine a transmission node and a transmission time using Markov chain or determine a transmission node and a transmission time using a result log file of an external MAC simulator and reflecting a transmission/reception time in an HW manner by turning ON/OFF a switch;

generating multiple correlated interferer signals for analyzing an effect of frequency interference in view of both of PHY and MAC layers; and analyzing an effect of frequency interference in view of both of PHY and MAC layers by defining the probability that the total interference power reaching a victim receiver by using the generated multiple interferers can be equal to or higher than an interference limit as an interference probability.

* * * * *